(No Model.)
J. McMURRIN.
HAND CAR.
No. 525,919. Patented Sept. 11, 1894.
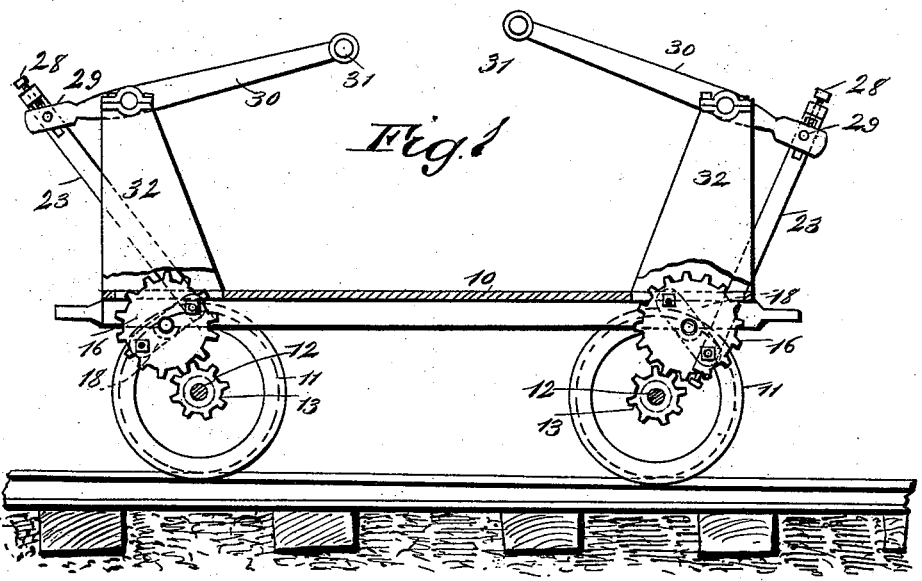
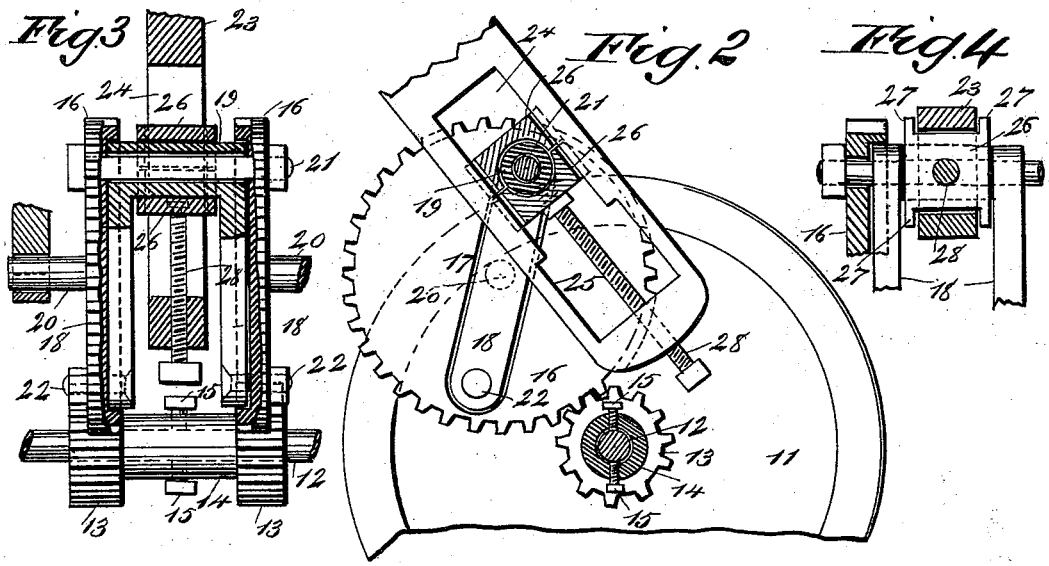
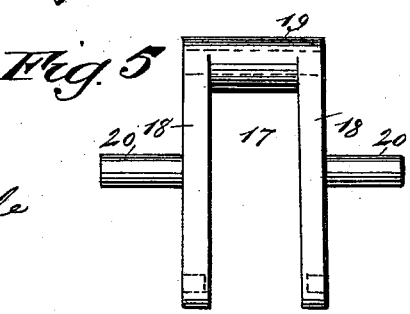
WITNESSES:
F. McArdle
C. Sedgwick
INVENTOR
J. McMurrin
BY Munn & Co.
ATTORNEYS.

UNITED STATES PATENT OFFICE.

JOSEPH McMURRIN, OF SHOSHONE, IDAHO.

HAND-CAR.

SPECIFICATION forming part of Letters Patent No. 525,919, dated September 11, 1894.

Application filed January 8, 1894. Serial No. 496,104. (No model.)

*To all whom it may concern:*

Be it known that I, JOSEPH MCMURRIN, of Shoshone, in the county of Logan and State of Idaho, have invented a new and Improved Hand-Car, of which the following is a full, clear, and exact description.

Section gangs are usually provided with hand cars, which have propelling mechanism generally arranged near the center of the car, and push cars which are adapted to carry ballast, rails, &c.

The object of my invention is to produce a car which has, to a certain extent, the advantages of both the hand car and push car, which has its propelling mechanism arranged at the ends of the car so as to leave a clear space in the center, in which ballast, rails, &c., may be piled, and also to provide a simple, strong and easily operated driving gear for the car.

To these ends my invention consists of certain features of construction and combinations of parts, which will be hereinafter described and claimed.

Reference is to be had to the accompanying drawings, forming a part of this specification, in which similar figures of reference indicate corresponding parts in all the views.

Figure 1 is a broken longitudinal section of a hand car showing my improvements. Fig. 2 is an enlarged detail sectional view of the lower end of the driving rod and its connection with the car axle. Fig. 3 is a broken detail sectional view, showing the connection between the driving rod and axle and showing clearly the construction of the crank and the manner in which it connects with the adjacent gear wheels. Fig. 4 is a detail cross section through the driving rod and shows its connection with the crank, and the manner in which the journal boxes are held on the driving rod; and Fig. 5 is a detail view of the crank which is connected with the driving gear wheels.

The car 10 may be of any usual construction, and it is mounted in the common way on wheels 11 which are provided with the ordinary axles 12. In the drawings I have shown the driving mechanism connected with each axle and it is, of course, necessary to describe only the connection with one axle. On the axle are pinions 13, which are connected together by a sleeve 14, see Fig. 3, and the sleeve is fastened rigidly to the axle by means of set screws 15. The pinions 13 are revolved, thus turning the axle and wheels, by gear wheels 16 which, when united as described below, form practically one double faced gear wheel.

The gear wheels are united by a crank 17 by which also they are turned, which crank has parallel side pieces 18 adapted to be fastened in slots in the inner sides of the gear wheels, a journal 19 connecting the side pieces at one end, and trunnions 20 which project from the central portions of the side pieces on their outer sides, these trunnions being adapted to extend through the centers of the gear wheels 16 and turn in suitable bearings on the adjacent car frame.

The gear wheels 16 are fastened to the crank 17 by means of a bolt 21, which extends through the journal 19 of the crank and through both gear wheels, the bolt having a suitable head and nut thereon, and also by means of short bolts 22 which extend through the gear wheels and through the opposite ends of the side pieces 18. It will thus be seen that the crank is formed in a single piece and is very strong, and the manner in which it is connected with the gear wheels is such that there is little danger of breaking any of the parts and the construction is also very cheap.

The crank 17 connects with a driving rod 23 which extends upward to the propelling lever, the driving rod being slotted at its ends, as shown at 24, and the slot being widened at one point, as shown at 25, to enable the boxes 26 to be conveniently placed in the slot, these boxes having side flanges 27 which, when the boxes are in place, clasp or overlap the sides of the driving rod, as clearly shown in Fig. 4, so as to prevent the lateral displacement of the boxes. The boxes, at the lower end of the rod, are adapted to clasp the journal 19 of the crank 17, and the boxes at the upper end clasp the pivot of the driving lever, as described presently.

The boxes 26 are adjusted and held in place in the slot 24 of the driving rod, by a set screw 28, which is threaded in the end of the rod and abuts with one of the boxes, as shown clearly in Fig. 2. The box, at the upper end of the driving rod, is connected with the pivot pin 29 of the tilting lever 30, which is arranged in substantially the usual way, having at its inner end a handle 31 and being journaled or fulcrumed on top of a post 32 on the end of the car 10. It will thus be seen that the arrangement of the posts and working levers, at the ends of the car, leaves the middle portion of the car clear, so that articles may be conveniently piled thereon, and it will be further observed that the construction of the driving mechanism is very simple and strong and that the car may be worked from either end. The car is operated in the usual way by working the levers 30 up and down, the driving rod 23 turning the crank 17, gear wheels 16, pinions 13 and the axles of the car.

Having thus described my invention, I claim as new and desire to secure by Letters Patent—

1. The combination, with the car and double pinions on the axle, the double gear wheels meshing with the pinions, a crank on the double gear wheels, trunnions on the crank which project through the ends of the gear wheels and serve as journals for the same, and a lever mechanism connected with the crank to turn the same, substantially as described.

2. The combination, with the car and the double pinions on the axles thereof, of the oppositely arranged gear wheels meshing with the pinions, a crank having side pieces fastened to the inner sides of the gear wheels and a journal connecting the side pieces at one end, fastening bolts extending through the ends of the side pieces and through the gear wheels and also through the gear wheels and the crank journal, trunnions on the side pieces projecting through the gear wheels and forming their journals, and a lever mechanism connected with the crank journal to turn the same, substantially as described.

3. The combination, with the crank and its gear wheels, of the driving lever, the slotted driving rod connecting the lever with the crank, boxes slidably mounted in the lever and connected with the crank journal, and a set screw for adjusting the boxes, substantially as described.

4. The combination of two gear wheels having their inner faces grooved and provided with central apertures, and a crank provided with side pieces, fitting in the grooves of the pinions and having trunnions projecting therefrom, said trunnions extending through the apertures of the gear wheels, substantially as described.

JOSEPH McMURRIN.

Witnesses:
A. M. McCALL,
J. E. BURKE.